United States Patent Office 3,033,269
Patented May 8, 1962

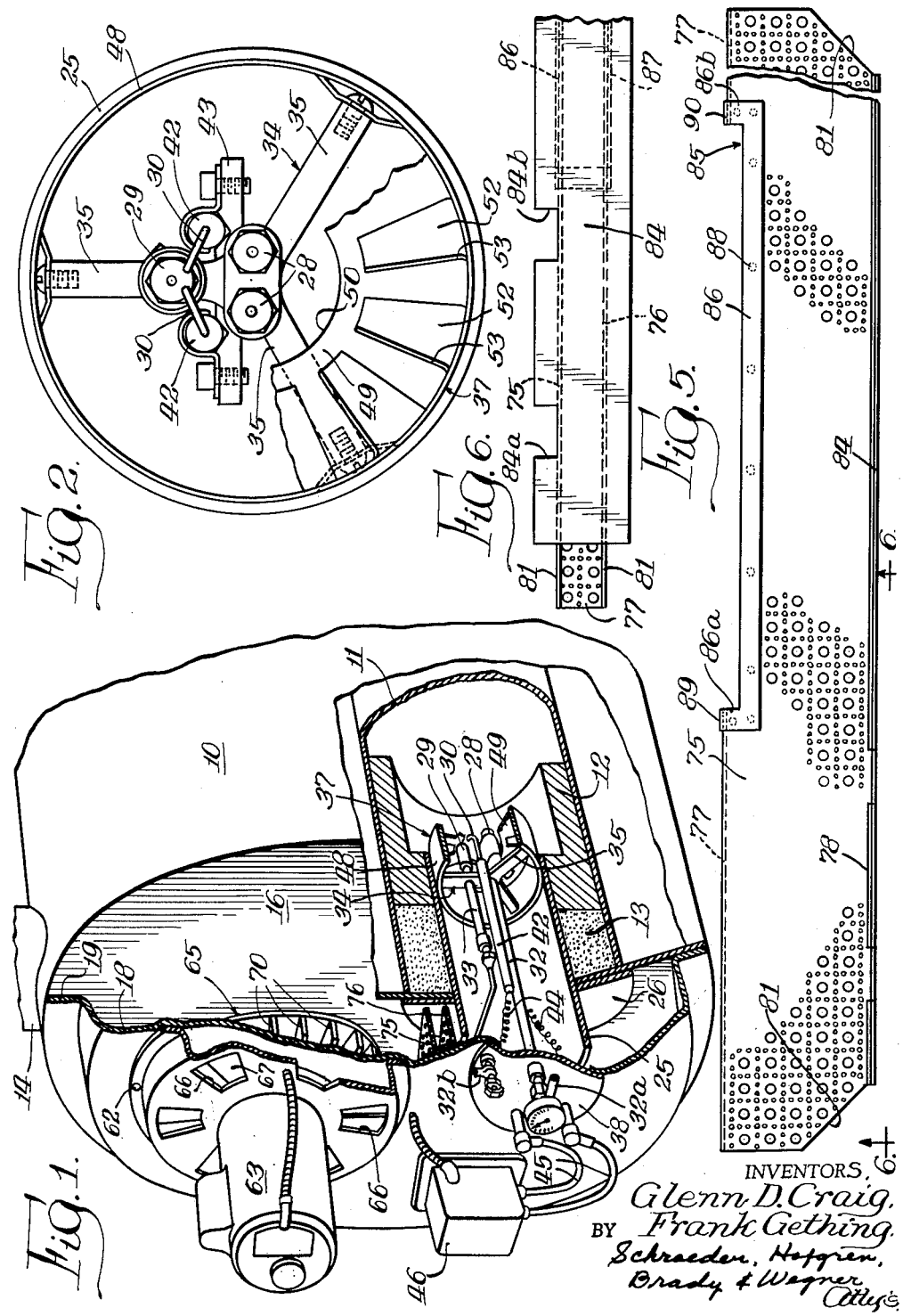

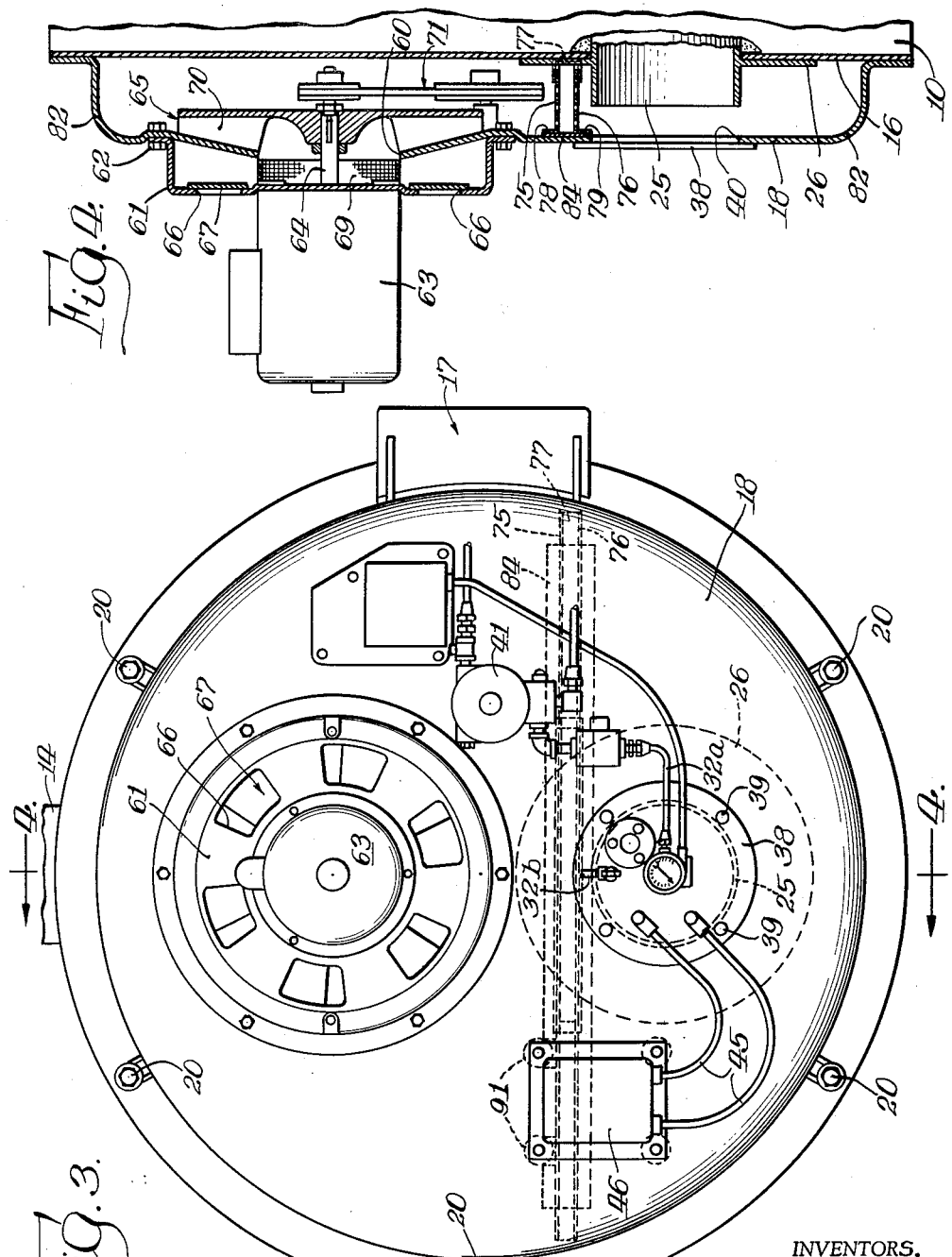

3,033,269
FUEL BURNER AIR SYSTEM
Glenn D. Craig and Frank Gething, Milwaukee, Wis., assignors to Cleaver-Brooks Company, a corporation of Wisconsin
Filed July 23, 1957, Ser. No. 673,598
8 Claims. (Cl. 158—1.5)

This invention relates to burner apparatus, and more specifically to apparatus for supplying air to support combustion of fuel in the combustion chamber of a boiler.

It is a general object of the invention to provide a new and improved air supply apparatus of the character described.

The air supply apparatus of this invention is particularly adapted for use with horizontal fire tube boilers of the type including a horizontally disposed boiler shell with a horizontal fire tube supported in the lower portion of the shell and providing a combustion chamber. Air is supplied to the combustion chamber from a plenum chamber. In the boiler chosen to illustrate the invention, an inner boiler door closes one end of the boiler shell, and an outer dish-shaped boiler door, together with the inner door, defines the air plenum chamber. Air is drawn into the plenum chamber by an intake fan positioned adjacent air inlet openings near the top of the chamber. Air is discharged from the plenum chamber through an air outlet opening leading to the combustion chamber.

Rotation of the intake fan in the upper portion of the plenum chamber causes rotation of the air within the chamber. Since the fan is not mounted concentrically within the cylindrical shaped plenum chamber, rotation of the air is not uniform or concentric with the chamber or the fan, but tends to be concentric with both the chamber and the fan, thereby causing a turbulence and unbalance in the air flow. Apparently, the general and over-riding tendency is for the air to rotate somewhat concentrically with the plenum chamber. The air outlet opening in the lower portion of the plenum chamber is of a relatively small diameter and the plenum chamber of a relatively larger diameter. Thus, the rotating air must converge to a smaller diameter to enter the burner tube, and the rotational velocity of the air increases as the diameter decreases. The increase of velocity gives rise to a loss of pressure taken at the burner tube entrance, and because of the pressure loss there results a reduced volume of air flow to the combustion chamber, thereby reducing the efficiency of the apparatus.

Accordingly, with the above and other considerations in mind, it is an object of this invention to provide a new and improved air supply system for boiler apparatus of the type described which eliminates air turbulence and rotation at the plenum chamber outlet, thereby reducing the pressure loss.

In the boiler embodiment illustrated, air is discharged from the plenum chamber into an air duct leading to the combustion zone, and a diffuser plate is positioned across the outlet end of the air duct to distribute the air properly in the combustion zone. If the air entering the air duct from the plenum chamber is turbulent and pre-rotating, this pattern continues as the air moves to the diffuser plate, and considerable difficulty is encountered in obtaining uniform air distribution and the proper air flow pattern in the combustion zone without taking an excessive pressure drop across the diffuser plate.

Accordingly, another object is to provide a new and improved air supply system for boiler apparatus of the character described which eliminates turbulence and pre-rotation in air flowing to the diffuser plate.

A more specific object is to provide a new and improved air supply system for boiler apparatus of the type described, including an air baffle extending across the plenum chamber between the air intake fan and the plenum chamber outlet for eliminating air turbulence at the plenum chamber outlet.

Another object is to provide a new and improved air supply system of the character described including a baffle in the form of perforate plate means extending across the plenum chamber between the intake fan and the burner tube entrance for passing air from the upper portion of the plenum chamber to the lower portion of the plenum chamber while eliminating air turbulence and rotation without a substantial pressure loss, to thereby provide a uniform flow and distribution of air to the plenum chamber outlet and to the diffuser plate at the air duct outlet.

Another object is to provide, in an air supply system of the type described, a new and improved reinforcing air baffle for eliminating air turbulence at the plenum chamber outlet and for reinforcing the walls of the plenum chamber.

A further object is to provide, as an article of manufacture, a new and improved air baffle of the type described in the preceding paragraphs.

Other objects and advantages will become readily apparent from the following detailed description taken in connection with the accompanying drawings, in which:

FIG. 1 is a fragmentary perspective view, partly broken away, of a boiler apparatus embodying the principles of the present invention;

FIG. 2 is an end elevational view of the outlet end of the burner tube included in the boiler illustrated in FIG. 1;

FIG. 3 is an end elevational view of the left end of the boiler apparatus illustrated in FIG. 1;

FIG. 4 is a fragmentary vertical sectional view, taken at about the line 4—4 of FIG. 3, with the boiler shell in elevation and with parts omitted to simplify the figure;

FIG. 5 is a fragmentary plan view of an air baffle constructed according to the principles of the present invention for use in a boiler apparatus of the type illustrated in FIG. 1;

FIG. 6 is a fragmentary front elevational view of the baffle illustrated in FIG. 5, taken at about the line 6—6 of FIG. 5.

While an illustrative embodiment of the invention is shown in the drawings and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawings, as illustrated, the invention is embodied in a horizontal fire tube boiler which includes a horizontally disposed cylindrical boiler shell 10. The boiler shell may be supported by any suitable means, such as supporting skids (not illustrated) suitably secured to the bottom of the shell and conveniently adapted to facilitate movement of the boiler and to rest on a suitable boiler foundation, all as is conventional and well known in the art.

A horizontally disposed fire tube 11 of suitable metal material is supported in the lower portion of the boiler shell and provides a combustion chamber. Near the front end of the boiler, in the combustion zone, the fire tube 11 is lined for a portion of its length with a suitable dry oven refractory material 12, and forwardly of the refractory 12 is lined with a suitable insulating refractory material 13. Combustion occurs in the fire tube in the vicinity of the refractory 12, and boilers of the type described normally include suitable structure forming multiple passes for combustion gases through the boiler. Ultimately, after multiple passes through the boiler, the combustion gases flow to an exhaust stack 14 for discharge from the boiler shell.

At the front end of the boiler, the shell 10 is closed by an inner front boiler door 16 in the form of a circular plate which may be secured in any suitable manner to the boiler shell, but which is preferably supported on the shell through the medium of a hinge mechanism illustrated in general at 17 (FIG. 3). In addition to the inner door 16, the front of the boiler shell is closed by an outer dish-shaped boiler door 18 of generally cylindrical configuration and including a radially outwardly turned flange 19 which abuts against the inner door 16 so that the two doors together form an air plenum chamber of generally cylindrical configuration and having a relatively large diameter and a relatively short length. As will be described presently, air is drawn into the plenum chamber from atmosphere and is discharged from the plenum chamber to the combustion chamber. The outer door 18 may be supported on the boiler shell in any suitable manner, but it preferably is hinged on the boiler shell through the medium of hinge mechanism 17 to facilitate opening and access to the interior of the boiler. When the doors 16 and 18 are in closed positions, they may be held by means of screws or bolts illustrated at 20 in FIG. 3.

A burner tube 25 of cylindrical configuration is fitted in suitable openings provided in the inner door 16, the refractory 13 and the refractory 12. One end of the burner tube extends into and opens into the plenum chamber formed between doors 16 and 18, and the other end of the burner tube extends to and opens into the combustion chamber formed in the refractory 12 and the fire tube 11. The burner tube functions as a support for burner apparatus and also functions as an air duct for conducting combustion air from the air plenum chamber to the combustion chamber. The burner tube may be secured in place as illustrated by means of an integral outwardly extending flange 26 secured to the inner door 16 by any suitable means.

As best seen in FIGS. 1 and 2, the burner apparatus incorporated in the boiler chosen for illustration includes a pair of main burner nozzles 28 which are centrally located in the burner tube 25, with the forward ends of the nozzles displaced slightly inwardly from the end of the burner tube adjacent the combustion chamber. Positioned centrally between the main burner nozzles 28 and somewhat thereabove, there is provided a pilot burner nozzle 29 utilized for igniting fuel discharged from the main burner nozzles. Fuel discharged from the pilot nozzle 29 is ignited by suitable ignition means including a pair of ignition electrodes 30.

The main burner nozzles 28 are supported on the end of a main burner fuel supply pipe 32, and the pilot burner nozzle is supported on the end of a pilot fuel supply pipe 33. The fuel pipes 32 and 33 are in turn supported on a spider structure through which the pipes pass. The spider structure 34 includes three equally spaced radially extending legs 35 which are secured at the ends to a diffuser 37 supported in the burner tube 25. The fuel supply lines 32 and 33 extend from the nozzles to a mounting plate or closure member 38, through the member 38, and are suitably secured thereto, so that the plate 38 functions as a support for the lines. The plate 38 is removably secured to the outer side of the outer boiler door 18 by suitable means 39 and fits over an opening 40 in the outer door 18 which permits removal of the burner apparatus when the plate 38 is detached from the door. Externally of the plate 38, the fuel lines 32 and 33 connect respectively with supply lines 32a and 32b which lead from a pump 41 mounted externally on the door 18.

The ignition electrodes 30 are conductive sparking elements having their major portions suitably encased in insulators 42 which are held by a mounting bracket 43 (FIG. 2) in turn supported on the main burner fuel supply pipe 32. The ends of the ignition electrodes 30 remote from the combustion chamber are connected with suitable conductors 44 (FIG. 1) which pass through the plate 38 and are connected exteriorly with conductors 45 leading to an ignition transformer 46 mounted externally on the door 18.

The diffuser 37 includes a cylindrical wall portion 48 which is fitted in burner tube 25 at the end of the tube adjacent the combustion chamber. At the end of the cylindrical wall 48, the diffuser is formed with a diffuser plate 49 which extends transversely across the duct or passage provided by the cylindrical wall 48 and by the burner tube 25. The diffuser plate is formed with a central opening 50 suitably aligned with the burner nozzles to permit discharge of fuel from the nozzles into the combustion chamber through the opening 50. Additionally, the diffuser plate 49 is formed with radially disposed louvers or baffles 52 which provide radially disposed air outlet openings 53. The diffuser 37 functions to distribute combustion air from the duct 25 uniformly to the combustion zone and to impart to the air a proper air flow pattern sufficient to insure efficient combustion of fuel in the combustion chamber.

The upper portion of the outer door 18 is formed with a circular air inlet opening 60 (FIG. 4) through which air is drawn from atmosphere into the plenum chamber formed between the outer door and the inner door. A dish-shaped fan motor support 61 is secured by bolts 62 to the outer door 18 concentrically with the air inlet opening 60. The motor support 61 carries a fan motor 63 having a drive shaft 64 on which is mounted an intake fan wheel 65. The motor support 61 is formed with a plurality of air inlet openings 66 concentrically arranged about the fan motor and controlled by an adjustable damper means 67 for regulating the size of the openings 66. Operation of the motor 63 causes rotation of fan wheel 65, drawing combustion air from atmosphere through the motor support openings 66, through a screen 69 for cleaning the air, into the center portion of the fan wheel and thence radially of fan wheel between fan blades 70, into the plenum chamber.

A belt drive means 71 may be connected from the motor shaft 64 to drive the fuel pump 41.

Air drawn into the plenum chamber by the intake fan 65 is discharged from the plenum chamber into the open end of the burner tube 25, and passes through the burner tube to the diffuser plate 49, through the diffuser plate and into the combustion chamber. As described at the beginning of this specification, the fan wheel causes rotation of the air in the plenum chamber which tends to be concentric with both the fan wheel and the plenum chamber, thus causing turbulence and unbalance in the air flow. If the air swirls uncontrolled in the plenum chamber, it rotates somewhat concentrically with the chamber, in a circle of rather large diameter conforming generally to the diameter of the plenum chamber and must converge to the relatively small diameter of the burner tube (about ⅙ the diameter of the plenum chamber in the embodiment illustrated) to enter the tube, the rotational velocity of the air must increase generally in proportion to the decrease in diameters from the plenum chamber diameter to the burner tube diameter, and the increase of rotational velocity results in a loss of pressure at the burner tube entrance and a reduced volume of air flow to the combustion chamber.

Also, if the air entering the burner tube is turbulent and pre-rotating, it reaches the diffuser plate 49 in a similar state, and as a result, it is difficult to uniformly distribute the air to the combustion chamber and impart to it the proper flow pattern in the combustion chamber without taking an excessive pressure drop across the diffuser plate.

According to the invention, in order to eliminate the problems described above, an air baffle means is provided in the plenum chamber to eliminate the turbulence and rotation due to the action of the fan and to regulate the air flow to the lower portion of the plenum chamber to provide an even air flow and uniform distribution of air at the burner tube entrance and along the burner tube to the diffuser plate.

The air baffle means referred to extends across the plenum chamber between the air intake fan and the burner tube entrance, dividing the plenum chamber into upper and lower portions. As illustrated, the air baffle comprises a single sheet of perforate metal which originally is of a flat elongated rectangular shape. The single sheet of perforate metal is bent to form a first elongated panel 75 of generally rectangular shape which extends transversely across the plenum chamber between the fan wheel and the burner tube entrance. A second elongated panel 76 of a size and shape conforming to panel 75 is disposed in underlying spaced parallel relationship to the panel 75. A third panel 77 of elongated rectangular shape has its longitudinal edges joined respectively to overlying longitudinal edges of the panels 75 and 76, thus joining the panels 75 and 76, and abuts against the inner door 16. At the opposite longitudinal edges, the panels 75 and 76 are formed with outwardly turned flanges 78 and 79 respectively which lie in a plane parallel to the third panel 77. The panels 75, 76 and 77 and the flanges 78 and 79 thus form an integral one-piece baffle of perforate metal. As best seen in FIG. 5, the corners at opposite ends of the panels 75 and 76 adjacent the outer door 18 are beveled off, as illustrated at 81 in order to conform generally to the rounded corner 82 in the outer door 18.

An elongated rectangular reinforcing strip 84 of suitable metal material is positioned against the flanges 78 and 79, and is suitably secured to each of the flanges as by welding. The reinforcing strip 84 is coextensive with the flanges 78 and 79, and bridges the gap between the panels 75 and 76 to thereby reinforce the latter panels. The reinforcing strip 84 abuts against the outer door 18 and is secured to the door as by means of welding, for example.

As best seen in FIGS. 1 and 3, the air baffle described extends across the plenum chamber at a level such that it intersects the mounting flange 26 extending outwardly from the burner tube 25. Accordingly, in order to fit the baffle over the flange 26, the vertical joining panel 77 is cut out, and the panels 75 and 76 are recessed as illustrated generally at 85 in FIG. 5. The baffle is reinforced in the recessed area referred to by means of reinforcing strips 86 and 87 spot welded as illustrated at 88 to the panels 75 and 76 respectively. The strip 86 includes angled end portions 86a and 86b, and the strip 87 includes similar angled end portions. The end portion 86a is joined to the similar end portion of 87 by a strip 89 welded to panel 77. Similarly, end portion 86b is joined to the corresponding end portion of strip 87 by reinforcing piece 90 welded to the panel 77.

Recesses 84a and 84b (FIGS. 3 and 6) are formed along the upper edge of the reinforcing strip 84 and the flange 78 of panel 75 to provide space for mounting means 91 which holds the ignition transformer 46 on the door 18.

The perforate metal sheet of which the air baffle is comprised may consist of 22 gage metal of a standard manufacture commonly described as "cane perforated," and including about 36% open area, though the invention is not limited to these specific values. A perforate material having an open area of 30% to 40% will function to produce the desired results.

In operation, air drawn into the plenum chamber passes through the baffle panels 75 and 76 in flowing to the burner tube entrance. In passing through the baffle, only a slight pressure loss occurs, a loss of approximately .2" of water column, which is negligible, and the pressure loss occasioned is sufficient to cause uniform distribution of air flow across the entire baffle. Air turbulence and rotation due to the fan are eliminated in the lower portion of the plenum chamber, and air flows directly from the baffle to the burner tube entrance and through the burner tube evenly, and is uniformly distributed. Pressure losses at the burner tube entrance and across the diffuser plate due to air turbulence and rotation are eliminated, and the load on the fan is reduced.

The elimination of air turbulence makes it possible to burn the fuel more efficiently with less air per unit of fuel. Improved results attributable to the baffle have been confirmed in tests of the stack gases. In a 40 H.P. boiler model, without the air baffle, maximum $CO_2$ content was 12.5%, and with the baffle $CO_2$ was 14.8%, which indicates a substantially increased combustion efficiency as a result of use of the baffle.

The baffle is rigidly attached to the outer door 18 thereby reinforcing the door against damage by internal explosions. The baffle is positioned between the doors 16 and 18 with the panel 77 against the inner door 16, and thereby braces the inner door against deflection or buckling due to explosions within the boiler shell behind the door 16. Test results of controlled explosions set off in the boiler indicate that the added reinforcement provided by the baffle enables the boiler structure to withstand explosions and still remain in operating order.

We claim:

1. In a boiler apparatus, in combination, means forming an air plenum chamber of generally cylindrical configuration having a relatively large diameter and a relatively short length, air baffle means in the plenum chamber extending chordally across the chamber substantially from one side to the other to divide the chamber into two sections, one on each side of the air baffle means, an air intake fan mounted in the chamber, means providing an air inlet communicating with the fan and opening to one of said sides of the chamber and on an axis extending longitudinally of the chamber so that air delivered by the fan tends to swirl irregularly to generate air turbulence in said one section of the chamber, means forming an unobstructed round air outlet opening from the other section of the chamber for discharge of air to a fire tube or the like, and passage forming means formed in said air baffle means for passing air from said one section of the chamber to said other section thereof while eliminating air turbulence at the air outlet opening due to the action of the fan.

2. In a boiler apparatus including a tubular boiler shell and a fire tube supported in the lower portion of the shell, in combination, a plate closing one end of the shell, a dish-shaped member supported on the shell at said one end and defining with the plate an air plenum chamber of generally cylindrical configuration, said dish-shaped member having at least one air inlet opening in the upper portion thereof leading to atmosphere, said plate having an air outlet opening in the lower portion thereof leading to the fire tube, an air intake fan mounted in the upper portion of the plenum chamber for rotation on an axis parallel to the chamber axis for drawing air into the chamber through the air inlet opening for discharge through the air outlet opening to the fire tube, and an air baffle extending across the plenum chamber between the fan and the air outlet opening dividing the chamber into upper and lower portions so that air flowing from the upper portion to the lower portion must pass through the baffle, said baffle comprising a perforate plate for controlling air flow to eliminate air turbulence without substantial pressure loss.

3. In a boiler apparatus including a tubular boiler shell and a fire tube supported in the lower portion of the shell, in combination, an inner closure member closing one end of the shell, a cylindrical dish-shaped outer closure member supported on the shell at said one end and defining with the inner closure member an air plenum chamber, said outer closure member having an air inlet opening in the upper portion thereof leading to atmosphere, said inner closure member having an air outlet opening in the lower portion thereof leading to the fire tube, an air intake fan mounted in the upper portion of the plenum chamber for rotation on an axis parallel to the axis of the chamber and positioned adjacent the air inlet opening for drawing air into the plenum chamber for discharge through the air outlet opening to the fire tube, and an air baffle means extending across the plenum chamber between the fan and the air outlet opening dividing the plenum chamber into upper and lower portions so that air swirling in the upper portion of the chamber is required to pass through the baffle means to reach the lower portion of the chamber, said baffle means comprising a pair of spaced, overlying perforate plates for passing air while eliminating air turbulence and rotation, to thereby provide a uniform flow and distribution of air to the air outlet.

4. In a horizontal fire tube boiler having a horizontally disposed cylindrical boiler shell and a horizontally disposed fire tube supported in the lower portion of the shell and forming a combustion chamber, in combination, a circular inner door closing one end of the shell, a circular dish-shaped outer door supported on the shell at said one end and forming with the inner door an air plenum chamber, said outer door having an air inlet opening in the upper portion thereof, a burner tube opening at one end into the lower portion of the plenum chamber and opening at the other end into the combustion chamber, a burner nozzle supported centrally in the burner tube adjacent the combustion chamber, an air diffuser plate across the end of the burner tube adjacent the combustion chamber, having a central opening therethrough aligned with the burner nozzle, a series of radially extending openings therein, and baffles adjacent the radially extending openings for directing combustion air therethrough in a swirling pattern into the combustion chamber, an air intake fan mounted adjacent the air inlet opening for rotation on an axis parallel the axis of the plenum chamber for drawing combustion air into the plenum chamber for discharge into the burner tube, and an air baffle extending across the plenum chamber between the fan and the burner tube dividing the chamber into upper and lower portions so that air flowing from the upper portion to the lower portion must pass through the air baffle, said air baffle comprising perforate plate means for passing air while eliminating air turbulence and rotation without substantial pressure loss, to thereby provide a uniform flow and distribution to the burner tube and to eliminate prerotation of air passing to the diffuser plate.

5. In a boiler apparatus including a tubular boiler shell and a fire tube supported in the lower portion of the shell, in combination, an inner boiler door closing one end of the shell, a dish-shaped outer boiler door supported on the shell at said one end and defining with the inner door an air plenum chamber, said outer door having at least one air inlet opening in the upper portion thereof leading to atmosphere, said inner door having an air outlet opening in the lower portion thereof leading to the fire tube, an air intake fan mounted in the upper portion of the plenum chamber for drawing air into the chamber through the air inlet opening for discharge through the air outlet opening to the fire tube, and air baffle means extending across the plenum chamber between the fan and the air outlet opening to eliminate air turbulence at the air outlet opening due to the action of the fan, said air baffle means comprising, a first elongated panel of perforate metal extending across the plenum chamber between the fan and the air outlet opening, a second elongated panel of perforate metal of a size and shape similar to the first panel, and arranged in overlying spaced parallel relationship to the first panel, a third elongated panel of metal of a length comparable to the length of the first and second panels and having its longitudinal edges joined respectively to overlying longitudinal edges of the first and second panels, said third panel abutting said inner boiler door, each of said first and second panels having at the other longitudinal edge an outwardly turned flange joined thereto, lying in a plane parallel to the third panel, abutting said outer boiler door and secured thereto.

6. In a boiler apparatus including a tubular boiler shell and a fire tube supported in the lower portion of the shell, in combination, an inner boiler door closing one end of the shell, a dish-shaped outer boiler door supported on the shell at said one end and defining with the inner door an air plenum chamber, said outer door having at least one air inlet opening in the upper portion thereof leading to atmosphere, said inner door having an air outlet opening in the lower portion thereof leading to the fire tube, an air intake fan mounted in the upper portion of the plenum chamber for drawing air into the chamber through the air inlet opening for discharge through the air outlet opening to the fire tube, and reinforcing air baffle means extending across the plenum chamber between the fan and the air outlet opening to eliminate air turbulence at the air outlet opening and to reinforce the walls of the plenum chamber, said baffle means comprising, a single generally rectangular sheet of perforate metal bent to form a first elongated panel of generally rectangular shape extending across the plenum chamber between the fan and the air outlet opening, a second elongated panel of a size and shape similar to the first panel and arranged in overlying spaced parallel relationship to the first panel, a third elongated panel of a length comparable to that of the first and second panels, lying in a plane normal to the first and second panels and joining overlying longitudinal edges of the first and second panels, said third panel abutting said inner boiler door, and a pair of flanges, one extending outwardly from each of the first and second panels at its other longitudinal edge and lying in a plane parallel to the third panel; and an elongated reinforcing strip of metal positioned against said flanges, secured to each of the flanges, bridging the space between said first and second panels to brace said panels, abutting the outer boiler door and secured thereto.

7. In a boiler apparatus including a tubular boiler shell and a fire tube supported in the lower portion of the shell, in combination, a plate mounted on one end of the shell, a dish-shaped member supported on the shell at said one end and defining with the plate an air plenum chamber of generally circular cross section, said dish-shaped member having an air inlet opening positioned to one side of the center of the chamber and leading to atmosphere, said plate having an unobstructed generally circular air outlet opening positioned on the opposite side of said center and leading to the fire tube, an air intake fan mounted in the plenum chamber on an axis extending longitudinally in the chamber and positioned adjacent the air inlet opening for delivering air into the plenum chamber swirling irregularly in the chamber for discharge through the air outlet opening to the fire tube, and an air baffle extending chordally across the plenum chamber from one side to the other and from one end thereof to the other end thereof between the fan and the air outlet opening, dividing the chamber into two portions and having passage forming means for passing air from the fan to the portion of the chamber having said outlet while eliminating air turbulence and rotation due to the action of the fan, to thereby provide a uniform flow and distribution of air to the air outlet.

8. In a boiler structure including a tubular boiler shell and a fire tube supported in the lower portion of the shell and forming a combustion chamber, in combination, an inner closure member closing one end of the shell, a cylindrical dish-shaped outer boiler door supported on the shell at said one end and defining with the inner closure member an air plenum chamber, said outer door having an air inlet opening in the upper portion thereof, a circular burner tube opening at one end into the lower portion of the plenum chamber and opening unobstructedly at the other end into the combustion chamber and defining an air duct for conducting combustion air from the plenum chamber to the combustion chamber, a burner supported in the burner tube adjacent the combustion chamber, an air diffuser plate across the end of the burner tube adjacent the combustion chamber having openings therein and baffles adjacent the openings for directing combustion air therethrough in a swirling pattern, into the combustion chamber, an air intake fan mounted adjacent the air inlet opening in the outer door for rotation on an axis parallel to the plenum chamber axis to draw air into the plenum chamber swirling irregularly in the chamber for discharge into the duct, and air baffle means extending chordally across the plenum chamber from one side thereof to the other side thereof and from one end thereof to the other end thereof between the fan and the burner tube dividing the plenum chamber into upper and lower portions, providing communication between the upper and lower portions and for controlling the flow of air from the upper portion to the lower portion to prevent, in the lower portion, air turbulence and rotation present in the upper portion due to the action of the fan, so that air flow into the burner tube and to the diffuser plate is even and uniformly distributed.

References Cited in the file of this patent

UNITED STATES PATENTS

| | | |
|---|---|---|
| 1,743,048 | Sleaster | Jan. 7, 1930 |
| 1,969,506 | Frey | Aug. 7, 1934 |
| 2,000,733 | Avery | May 7, 1935 |
| 2,090,566 | Andler | Aug. 17, 1937 |
| 2,126,417 | Sharp | Aug. 9, 1938 |
| 2,253,414 | Arnold | Aug. 19, 1941 |
| 2,405,196 | Elliot | Aug. 6, 1946 |
| 2,502,664 | Nest | Apr. 4, 1950 |
| 2,814,430 | Beckett | Nov. 26, 1957 |
| 2,835,320 | McClure | May 20, 1958 |